United States Patent Office 3,072,960
Patented Jan. 15, 1963

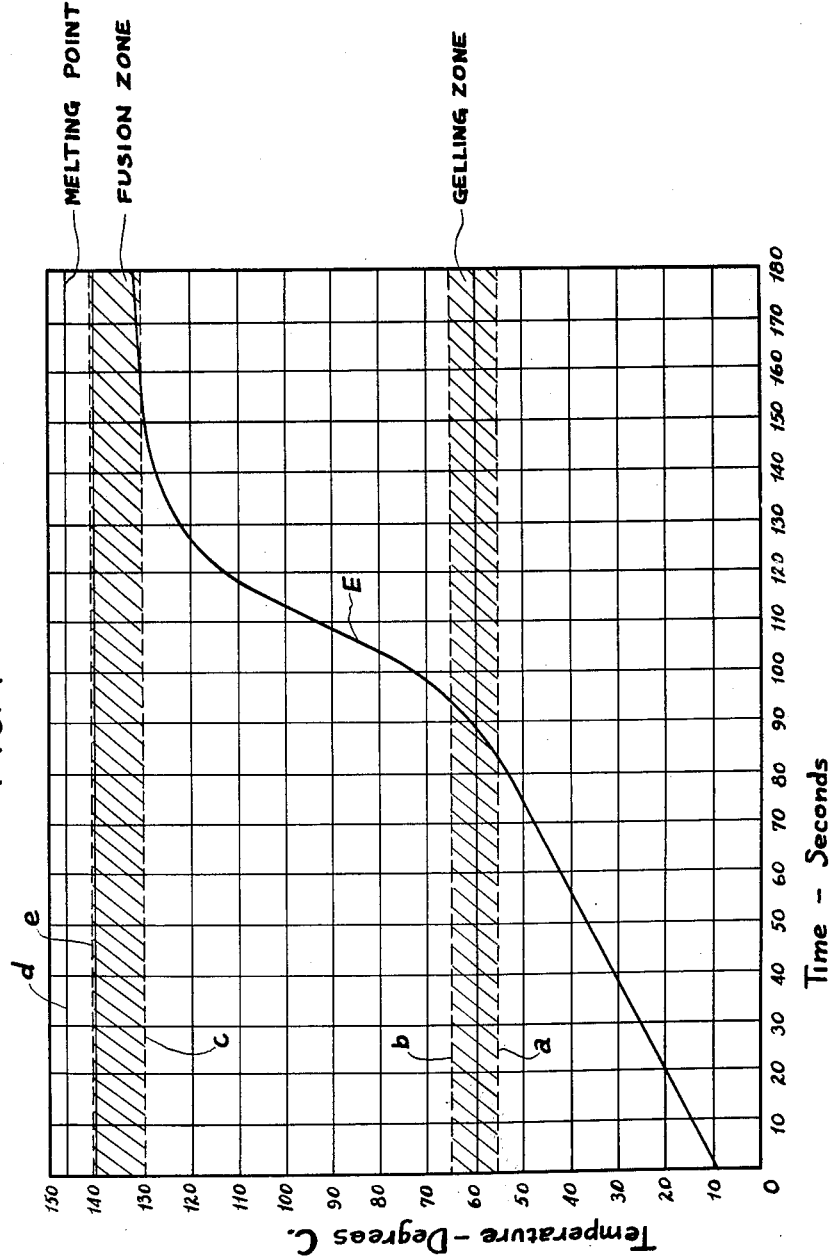

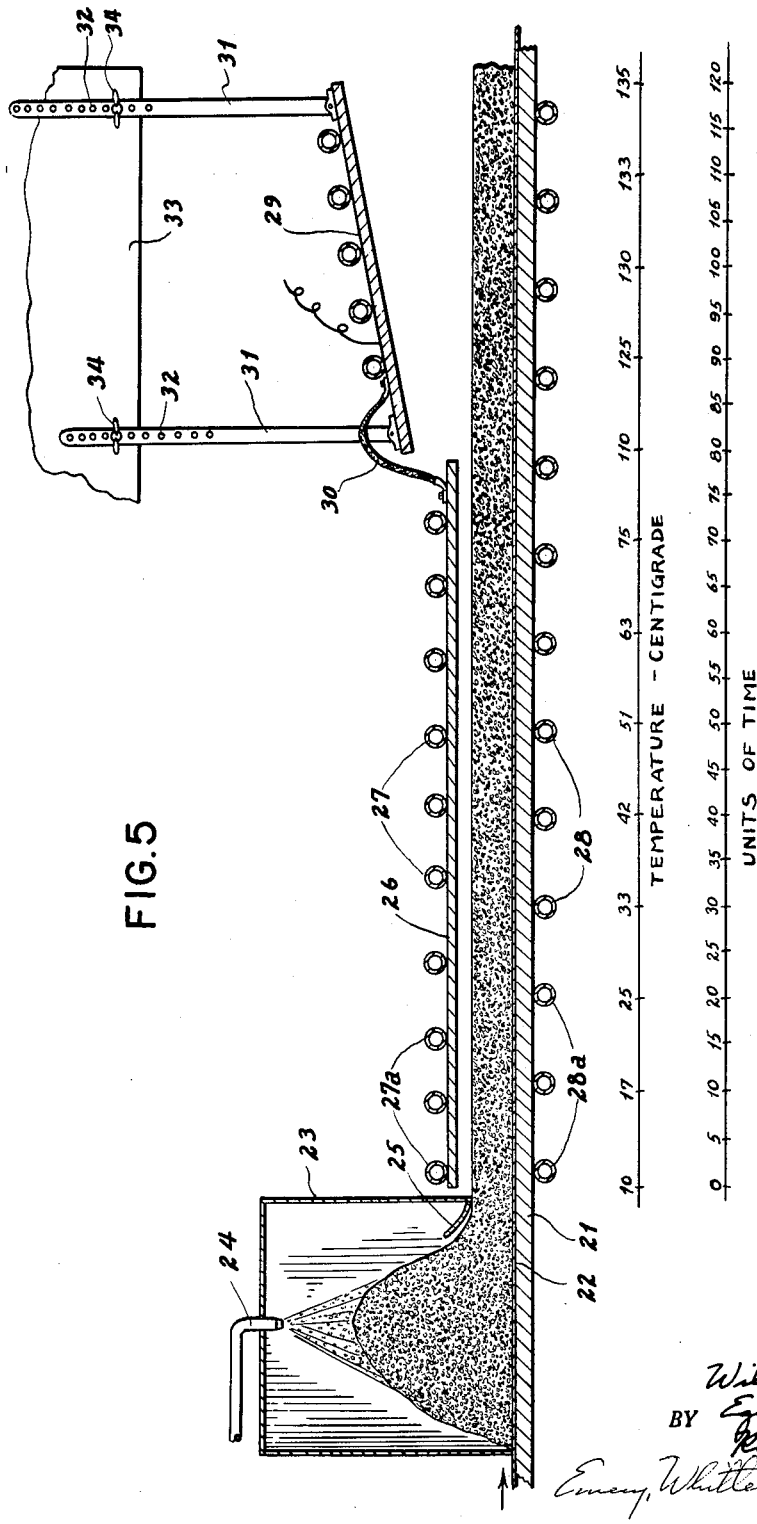

3,072,960
APPARATUS FOR CURING VINYL RESIN FOAM
William J. Smythe, Ridgewood, N.J., Egon M. Muller, Hastings on Hudson, N.Y., and Robert W. Weeden, Pompton Lakes, N.J., assignors, by mesne assignments, to Union Carbide Corporation, New York, N.Y., a corporation of New York
Original application Apr. 12, 1955, Ser. No. 500,754, now Patent No. 2,966,469, dated Dec. 27, 1960. Divided and this application Dec. 4, 1957, Ser. No. 700,718
6 Claims. (Cl. 18—6)

This invention relates to apparatus for curing vinyl resin foam for the production of cured cellular vinyl articles of the type popularly referred to as "sponge" or "foam."

This application is a division of co-pending application Serial No. 500,754, filed April 12, 1955, now Patent No. 2,966,469.

In the manufacture of cellular rubber articles from latex foam, radio frequency electric current has been used increasingly as a means of heating the uncured rubber latex foam to cure the same. By placing the uncured rubber latex foam between spaced electrodes, and passing radio frequency current therebetween, a field is created in which electrical energy is absorbed by the foam and is transformed into heat sufficient to cure the foam. This is known in the art as radio frequency heating, and in general, frequencies in excess of one megacycle are employed.

In the manufacture of cellular articles from vinyl resin foam, it has also been proposed to use radio frequency electric current as a means of heating the uncured vinyl resin foam to cure the same. But attempts to do so which have involved merely the application of methods or techniques previously used in curing latex foam have been only partially successful because of the many differences between uncured rubber latex foam and uncured vinyl resin foam.

It is an object of the present invention to provide apparatus for utilizing the great advantages of radio frequency heating in the curing of vinyl resin foam.

Other objects and advantages of the invention will appear hereinafter.

A preferred embodiment of the invention selected for purposes of illustration is shown in the accompanying drawings, in which FIGURE 1 is a diagram showing typical time-temperature curves for vinyl resin foam exposed to a field of radio frequency electrical energy.

FIGURE 4 is a diagram showing a time-temperature curve as modified according to the present invention.

FIGURE 5 is a vertical section through a continuous apparatus.

Figure 1:
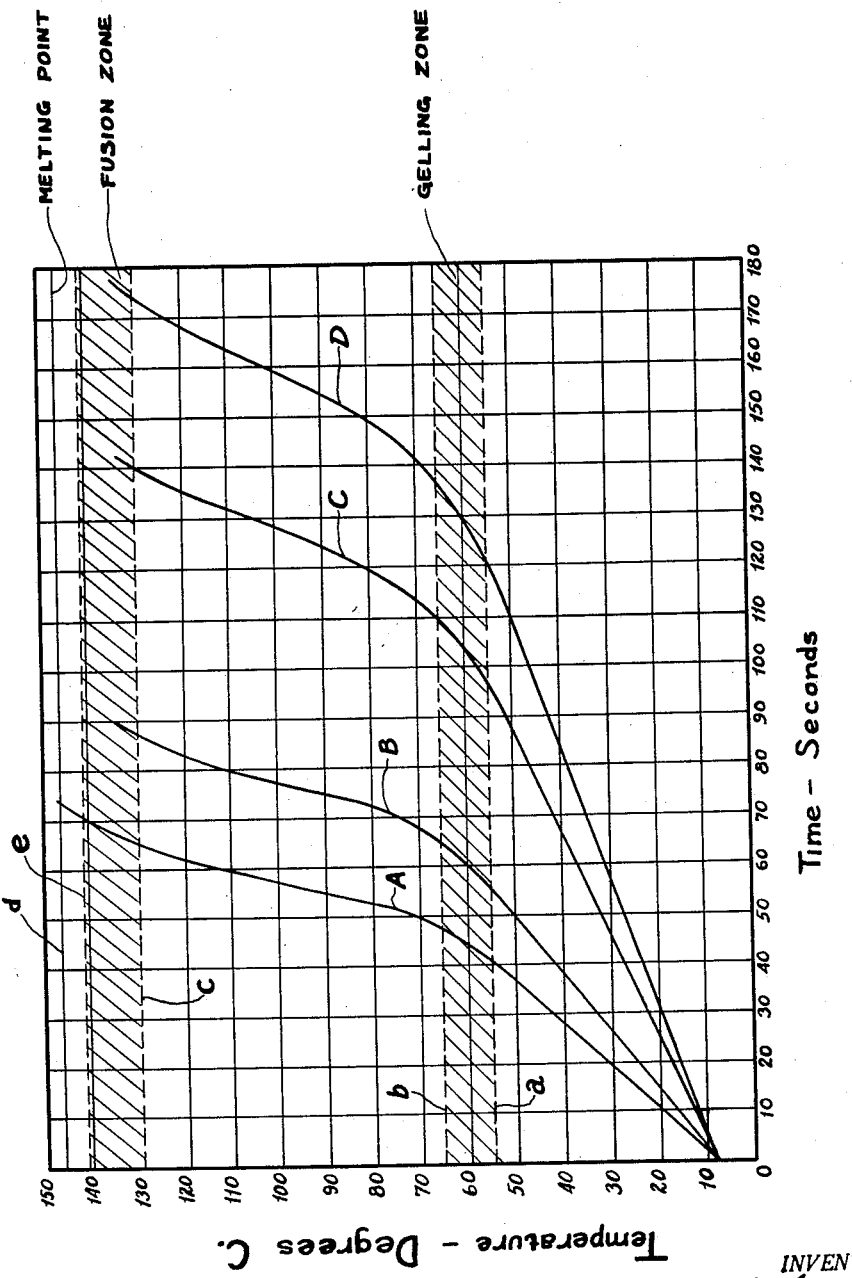
Figure 2:
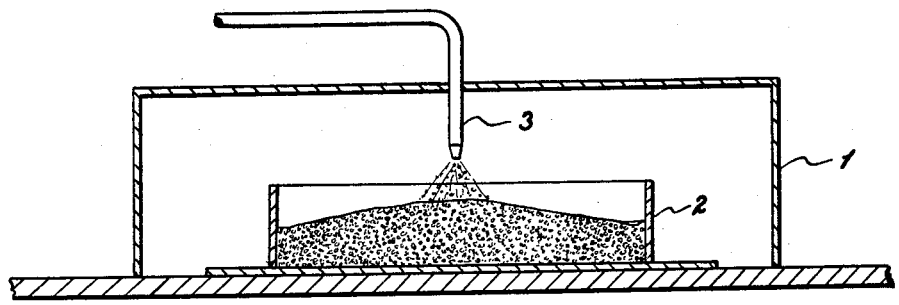
FIGURE 2 is a vertical section through a mold, showing the method of introducing foam.
Figure 3:
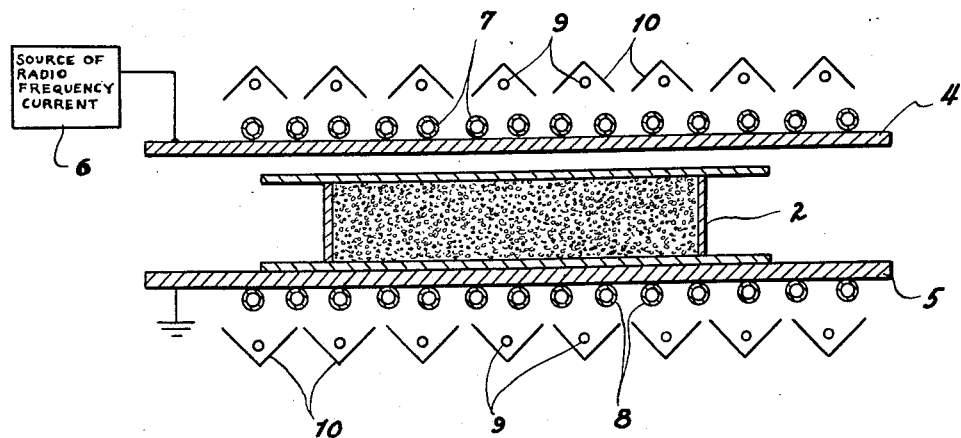
FIGURE 3 is a vertical cross section through a mold while being exposed to a field of radio frequency electrical energy.

The difference between uncured rubber latex foam and uncured vinyl resin foam are many and varied, and these differences result in vital differences in the behavior of the respective materials when exposed to a radio frequency field. For example, rubber latex is an aqueous dispersion containing a relatively high water content. Water absorbs electrical energy very rapidly and heats very rapidly when exposed to a radio frequency field. On the other hand the rubber content of the latex absorbs electrical energy relatively slowly and heats slowly when exposed to a radio frequency field. The heating which occurs, therefore, is due primarily to the absorption of electrical energy by the water content. As heating proceeds, the water in the latex is vaporized and leaves the material in the form of steam. The presence of water and the vaporization thereof tends to limit the rise in temperature to 100° C. and to hold it at substantially that level. Moreover, as the latex reaches its optimum degree of cure, the absorption of electrical energy decreases abruptly, and is disclosed in Bosomworth Patent No. 2,604,666, this phenomenon has been utilized as an indicator of the proper time for termination of the heating cycle. It is to be noted, however, that even if heating is not terminated at the time of this abrupt decrease in absorption of energy, the subsequent absorption of energy by the rubber is at an increasingly slower rate and, due to the effect of water in inhibiting the rise in temperature, there is little danger of over-curing or collapse of the foam unless the article is exposed to the radio frequency field for an excessively long time.

The vinyl resin plastisols which are used for the manufacture of vinyl foam are not aqueous dispersions but are, generally speaking, vinyl resins such as polyvinyl chloride or copolymers of vinyl chloride which are dispersed in sufficient plasticizer, selected from the various types of plasticizers known in the art, to produce a free flowing mixture. However, while these plastisols look like rubber latex and are somewhat similar in consistency, they are essentially different in character. Whereas rubber latex is essentially a dispersion of two immiscible materials, i.e. rubber particles and water, a vinyl resin plastisol is a dispersion of vinyl resin particles in a liquid plasticizer system and the two are miscible in all proportions at elevated temperatures. When a vinyl resin plastisol is exposed to a radio frequency field, there are not volatile constituents which are vaporized and driven off during the curing period in the manner in which water is vaporized during the curing of latex foam. There is, therefore, no inhibition to the rise in temperature such as exercised by the water in latex. Furthermore, there is no abrupt decrease in energy absorption such as occurs when rubber latex foam has been cured. On the contrary, the rate of heat absorption tends to increase during the curing period. Unlike the aqueous dispersions of rubber latex, the presence of even a small quantity of water in the uncured vinyl resin foam is disadvantageous, and one of the features of the present invention relates to avoiding the presence of water in the uncured foam.

Before proceeding further, it may be useful to define certain terms which are used in this specification, for the nomenclature of the art has not been stabilized. The manufacture of vinyl resin foam is a relatively new art, but some of the nomenclature used in connection with the manufacture of rubber foam has been carried over into the new art. Thus the terms "cure" and "vulcanize" are used more or less interchangeably in rubber manufacture to denote the process which changes the material from a raw to a finished condition under the influence of heat. The term "vulcanize" is not applicable to vinyl resin, but the term "cure" has been used by many to denote the process which changes a plasticized vinyl resin from a raw to a finished condition under the influence of heat. Others have maintained that "fuse" is a more accurate term to denote the change in vinyl resins. Another viewpoint is that the term "fuse" is properly applicable only to the final portion of the entire change from raw to finished state.

As hereinafter explained, the raw vinyl resin foam passes through two distinct transitional stages during the change from raw to finished state. In this specification, therefore, we shall use the term "cure" to refer to the overall process of change under the influence of heat from raw foam to finished state. During this overall process of change, we shall use the term "gel" to refer to the action which takes place during the first transitional stage which occurs, and we shall use the term "gelling zone" to refer to the temperature zone within which gelling occurs. At this stage the uncured material changes from a liquid dispersion to a solid capable of supporting itself.

We shall then use the term "fuse" to refer to the action which takes place during the second transitional stage, and we shall use the term "fusion zone" to refer to the temperature zone within which fusion occurs. The second transitional stage takes place at a considerably higher temperature than the first. During this stage the tensile strength of the material increases greatly. The curing of the article is complete when fusion is complete.

We shall then use the term "melt" to refer to the action which takes place at temperatures above the fusion zone and which results in a breakdown or collapse of the foamed article. Melting must be avoided, and an article which is inadvertently allowed to reach melting temperatures during the curing process is usually referred to as overcured.

Referring to FIGURE 1 of the drawings, typical curves are shown in which the temperature of the article is plotted against time of exposure in a radio frequency field. The four curves, designated by the letters A, B, C and D, illustrated typical conditions when specimens of a given plasticized vinyl resin compound, all foamed in a given manner, are subjected to a radio frequency field, each at different applied voltages. Except for the difference in voltage, all other conditions are identical. In each case the material was a polymer of vinyl chloride, plasticized with sufficient plasticizer to produce a free flowing mixture. The formulation was approximately as follows:

| | Parts |
|---|---|
| Polyvinyl chloride | 100 |
| Dioctyl phthalate | 70 |
| Dioctyl adipate | 10 |
| Stabilizers and other additives | 5 |

This material was foamed by the process of Schwencke Patent No. 2,666,036. Curve A was plotted from data observed at an applied voltage of 14.5 kv., curve B at an applied voltage of 14 kv., curve C at an applied voltage of 10.75 kv., and curve D at an applied voltage of 9 kv., all at frequencies of approximately 13 megacycles. As is to be expected, and as illustrated by the curves, the higher the voltage, the more rapid the heating. It will be noted, however, that each of the curves becomes steeper at a point at which the temperature of the material reaches approximately 55° C., indicating an increased rate of absorption of heat. This is the point where gelling begins, and as indicated by broken lines $a$ and $b$ in FIGURE 1, the gelling zone extends approximately from 55° to 65° C. and it appears that as gelling occurs during the passage through this zone a change occurs in the foam which enables it to absorb electrical energy at a faster rate.

The higher rate of absorption continues approximately to the lower border of the fusion zone, which is indicated by broken line $c$ in FIGURE 1, begins at about 130° C. The fusion zone, as above defined, may be considered to extend from this point to the melting point of the resin, approximately 146° C., indicated by solid line $d$, at which time collapse of the foam may be expected to occur. But since melting and collapse of the foam must be avoided in practice, we propose to establish an upper operating limit at a point approximately 5° C. below the point of melting and collapse, as indicated by broken line $e$. This zone, between lines $c$ and $e$ may be called the useful fusion zone. For the production of finished, cure foam of good quality in which fusion has been completed, but in which there is no overcuring, the temperature of the material must be brought into this zone, that is, it must rise above the lower limit $c$ and should stay below the upper limit $e$. Other formulations, other voltages, and other frequencies result in different curves, but always of the general type of curves A, B, C and D.

It will be noted that while all of the curves shown in FIGURE 1 tend to flatten out somewhat at or slightly below the lower limit of the fusion zone, they are all still ascending very steeply across the useful fusion zone. With curve A, for example, in which heating was continued to the point of collapse, the curve crosses the useful fusion zone in approximately two seconds and reaches the melting line in approximately ten seconds. With curves B, C and D in which heating was stopped within the useful heating zone, the rise is almost as rapid as in curve A, and in each case, the cessation of heating must be determined within a period of a few seconds. This results in difficult operating conditions, to avoid undercuring on the one hand and to avoid overcuring on the other hand. One of the features of the invention is to make the operating conditions less critical.

In practicing the invention, a suitable quantity of vinyl resin is first compounded with a suitable plasticizer and other ingredients to give the desired characteristics, and the resulting plastisol compound is then foamed by any suitable method. Preferably, the plastisol is foamed by the method disclosed in Schwencke Patent No. 2,666,036 or by the method disclosed in Smythe and Muller application Serial No. 408,434, filed February 5, 1954, and now abandoned, although other methods of foaming may be used, if desired.

We have discovered that the presence of even very minute quantities of water in the uncured foam are undesirable if cured foam of good quality is to be produced. We have also discovered that even though the resin is compounded and foamed under conditions such as to exclude moisture, it is, nevertheless, desirable to introduce the foam into the mold (or in a continuous operation, onto a conveyer belt, which for purposes of this specification will be considered a mold) in a dry atmosphere in order to avoid condensation and resulting entrainment of moisture from the air. Thus, the foam should be introduced into the mold in an atmosphere which contains not more than 70 grains of water per pound of air as a maximum. In winter, ordinary atmospheric conditions sometimes meet this requirement, but for year round commercial operations, the introduction of the foam into the mold should be conducted in a dehumidified space in which low humidity conditions can be maintained. If dehumidified rooms are not available, a hood 1 should be placed over the mold 2 while the foam is being introduced into the mold through nozzle 3. The space enclosed by the hood should be dehumidified to maintain an atmosphere containing not more than 70 grains of water per pound of air.

The material from which the molds are made should preferably respond as closely as possible to the heat absorbing characteristics of the foam during the curing cycle. The ideal mold material would be one having a time-temperature curve similar to that of the foam being cured, but such ideal material has not been found. Lacking such ideal material, one having a rate of absorption which is less than that of the plastisol is preferred. In general, polyester type resins have been found satisfactory for they absorb energy from the radio frequency field somewhat more slowly than vinyl foam and they are capable of withstanding curing temperatures without damage. Alkyd resin sheet stock reinforced with glass fibers is a particularly useful mold material. Materials such as metal or glass which absorb radio frequency heat very slowly are to be avoided, as are materials such as wood or cardboard which absorb heat rather rapidly, particularly if they contain moisture.

After the foam is introduced into the mold, the mold is placed between spaced electrodes 4, 5, electrode 4 being connected to a suitable source of radio frequency current 6, while electrode 5 is grounded. As previously described, the voltage applied may vary within wide limits, but since the higher the voltage, the faster the curing, relatively high voltages are indicated, particularly at the beginning of the heating cycle. Rapid curing is advantageous, not only because it is more economical but also because it results in the production of foam of better quality. In this connection it will be understood that there is a voltage drop or gradient across the space between the electrodes. Thus for any given applied voltage, the voltage which is actually effective on the material will be reduced by any air gap which may exist between the material and the electrodes. Herein we have used the term "applied voltage" to refer to the voltage applied to the electrode, and we shall use the term "effective voltage" to refer to the voltage which is actually effective on the material. Likewise, the higher the frequency, the faster the curing, and relatively high frequences are also indicated. Frequencies in the range of 5 to 30 megacycles per second have been found to give good results.

During the early portion of the heating cycle and at least until the material has passed through the gelling stage, it is important that the ambient temperatures surrounding the material should at all times approximate the temperature of the adjacent material in the mold. That is, as the temperature of the foam increases due to absorption of electrical energy, the ambient temperatures surrounding the material should also be increased, and as nearly as possible at the same rate. In this specification we are using the term "ambient temperature" in its ordinary dictionary meaning as defining the temperature of the medium surrounding the material, which medium may include both mold material and the surrounding atmosphere at points where the material is not in contact with a mold surface.

The importance of control of ambient temperatures arises from the following considerations. As previously pointed out, the raw foam is introduced into the mold in ungelled state. As the temperature rises, the raw foam is set by gelling. If, during this period, the heating is not substantially uniform throughout the body of foam, gelling takes place unevenly, and is likely to result in ruptures or weakened areas in the cured article. One of the great advantages of radio frequency heating is that it tends to produce uniform heating throughout the material which is being treated. But this very desirable effect can be seriously impaired if heat losses from the material due to radiation, conduction or convection are permitted to occur. Thus, since the electrodes of radio frequency heating equipment run cold, a considerable amount of heat absorbed by the material will flow from the material toward the electrodes unless precautions are take to prevent such flow.

In order to prevent this, we provide means for controlling the ambient temperatures surrounding the material. Thus, for example, we place a series of tubes or coils 7, 8 in contact with or adjacent each of the electrodes through which air or water or other suitable heat transfer fluid may be circulated. At the beginning of the heating cycle, the circulating fluid should be cool, approximating the temperature of the cold foam, but as the heating cycle progresses, the temperature of the circulating fluid should be increased, preferably at approximately the rate at which the temperature of the material is increasing, thus preventing heat loss from the foam while at the same time avoiding heat flow into the material tending to overheat the surface of the material.

The critical period during which it is most urgent to control ambient temperatures is until the foam is gelled. Thereafter, such control is less important. On the other hand, continued control of ambient temperatures throughout the heating cycle has the useful result of maintaining uniformity of temperature throughout so that when the fusion zone is reached, fusion takes place uniformly throughout. However, it is to be noted that in thus controlling ambient temperatures during the heating cycle, the purpose of the control is primarily to prevent loss of heat generated in the article by absorption of radio frequency energy, rather than to supply heat to the foam.

If desired the heating tubes or coils above described may be replaced or supplemented by radiant heat lamps 9 set in reflectors 10. Such lamps may be provided with suitable means for controlling the amount of heat given off. With sections of reasonable thickness, the control of electrode temperatures, as shown, may be sufficient, as the heat losses from the side walls will usually not be serious. With thicker sections, however, it will be desirable to control ambient temperatures on all sides of the material. While the drawings show heating elements only above and below the upper and lower electrodes, it will be understood that similar elements may be arranged opposite the sides of the material, if desired, or hot air may be blown toward the mold.

In some cases, however, despite all efforts to maintain ambient temperatures at the desired level, there may be some losses of heat from the foam to the mold, particularly during that portion of the heating cycle between the gelling zone and the fusion zone when the foam is absorbing heat very rapidly. In other cases, since, as previously noted, control of ambient temperatures is less important after the foam has been gelled, the operator, for economic reasons, or because of limitations of equipment, may choose to forgo the advantages of control after passing the gelling point, and may allow heat losses to occur. In cases where such heat losses do occur, there will be a temperature differential between the inside of the foam and the outside surfaces as the foam approaches fusion temperatures and the inside will reach fusion temperatures before the outside.

In such cases, or where for any reason the foam approaches fusion temperatures in a condition where such a temperature differential exists within the foam, it is inadvisable to continue exposure to the radio frequency field because of the danger of overcuring the inside before the outside is fully cured. In such cases, the following procedure may be adopted. At a time in the heating cycle shortly before any of the foam reaches minimum fusion temperature, radio frequency heating is discontinued temporarily while ambient temperatures are increased until the temperature of the outside foam is raised to at least the level of the inside. Then radio frequency heating is resumed until fusion is complete.

As previously pointed out, the exposure of the article to the radio frequency field continues through the first transitional stage where gelling occurs toward the second transitional stage where fusion occurs, and after the first transitional stage, the rate of absorption of electrical energy and the rate of temperature rise increases. According to the present invention, at some point in the heating cycle after gelling has been completed, rate of input of electrical energy is substantially reduced. This has the effect of reducing the rate of absorption of electrical energy and the rate of temperature rise, so that the temperature rise through the fusion zone proceeds more slowly. Thus, the determination of the end point of the heating cycle becomes less critical and there is less danger of either undercuring or overcuring. Indeed, if rate of input of electrical energy is very substantially reduced, the temperature rise may be substantially halted, or it proceeds so slowly that a variation in duration of the heating cycle of several minutes may be tolerated without danger of overcuring.

Preferably, the reduction in rate of input of electrical energy is made at or slightly before the time when the temperature of the article reaches the lower border of the fusion zone. By doing so, heating is allowed to proceed very rapidly during the major portion of the heating cycle, and the reduction in rate occurs only as the temperature of the article reaches the critical fusion zone. The reduction may be made either abruptly or gradually.

The reduction in rate of input of electrical energy may be accomplished in various ways, as by reduction of effective voltage or by reduction of frequency. Reduction of voltage is the preferred method, and if the radio frequency generator is of a type in which the voltage output or the frequency may be varied, it is very simple to reduce the applied voltage or frequency when desired. Alternatively, the article may be moved from a high voltage field into a lower voltage field, or from a high frequency field to a lower frequency field. Or, if the electrodes are so mounted that their spacing can be changed, the effective voltage may be easily reduced simply by increasing the spacing between the electrodes, without altering the applied voltage.

The effect of reduction of effective voltage is illustrated graphically in FIGURE 4 by curve E. In this case, the formulation and the method of foaming was the same as in the case of curves A, B, C and D. The applied voltage was 12.5 kv. The curve E was observed under conditions such that as the temperature of the material approached the lower border of the fusion zone, a gradual reduction in effective voltage was made by gradually increasing the spacing of the electrodes so as to increase the air gap. The reduction in voltage was begun after the material had been exposed to the high voltage field for approximately 120 seconds and had reached a temperature of about 110° C. As shown, the effect of the reduction is to slow down the absorption of heat and to greatly increase the time during which the material may remain in the field without danger of overcuring and collapse. The condition illustrated by the curve E is merely representative of a satisfactory condition, but other conditions may be established as desired in which the reduction of effective voltage is greater or less or is made more abruptly or more gradually. In any event, heating is terminated before the temperature if the foam rises to a point within 5° C. of the melting point.

In FIGURE 5 in which apparatus adapted for the continuous production of sheet stock is illustrated, the grounded electrode 21 also serves as a table to support a conveyor belt 22 which is moved along the electrode at a suitable fixed rate. As previously described, the depositing of the foam on the conveyor belt should be conducted in dehumidified space, and if dehumidified rooms are not available, a hood 23 should be placed over the end of the conveyor where the foam is introduced through nozzle 24 and an atmosphere containing not more than 70 grains of water per pound of air should be maintained therein. A doctor blade 25 is arranged at a suitable position to control the thickness of the layer on the conveyor.

The electrode 26 is mounted parallel to the electrode 21 and is spaced therefrom at a distance sufficient to accommodate the layer as controlled by the doctor blade. The electrode 26 should extend lengthwise of the conveyor a distance sufficient so that, having regard to the speed of the conveyor, the temperature of the material, as it moves from one end of the electrode to the other, will rise to a point above the gelling gone, and preferably near or slightly below the lower limit of the fusion zone. Thus as indicated in the time-temperature scales accompanying FIG. 5 any given unit of material on the conveyor would, during the period of 80 seconds required to move from one end of the electrode 26 to the other, rise in temperature from approximately 10° C. to approximately 110° C. Thus, by the time the material emerges from beneath electrode 26, it is completely gelled and is rapidly approaching the fusion zone.

Meanwhile, however, precautions are taken to control ambient temperatures surrounding the material, at least until it passes through the gelling zone. For this purpose, tubes 27, 28 are provided, above and below the electrodes, through which air or water or other suitable heat transfer fluid may be circulated. In the first tubes 27a, 28a nearest the entrance end of the spaced electrodes, it will usually be necessary to circulate cooling fluid, for in a continuous process, the other portions of the electrodes are either heated or absorb heat which would be conducted toward the entrance portions. The remaining tubes, however, will require circulation of heating fluid, preferably at an increasing temperature along the conveyor, so that the ambient temperatures will increase as the temperature of the material increases. The objective, as previously explained, it is to keep ambient temperatures as nearly as possible equal to the temperature of the material at all points along the conveyor. In a continuous operation as illustrated, which may continue for a considerable length of time, it is possible to establish and maintain ambient temperatures which closely approximate the foam temperatures along the conveyor.

As the material emerges from beneath electrode 26, it is subjected to reduced effective voltage during the remainder of the curing period during which fusion takes place. In the embodiment illustrated, this is accomplished by utilizing a third electrode 29 which is spaced from the electrode 21 a greater distance than the electrode 26. Thus, even though the electrode 29 may be electrically connected to electrode 26 by flexible straps 30 so that the applied voltage of electrode 29 approximates that of electrode 26, the effective voltage across the material will be greatly less due to the increased air gap. Furthermore, in the embodiment illustrated, the electrode 29 is tilted so that the effective voltage decreases progressively as the material progresses beneath it. In this manner the temperature of the material can be prevented from reaching the danger zone where melting and collapse might be expected. In the embodiment illustrated, the electrode 29 is adjustably mounted being carried on member 31 which are pivotally connected to the electrode. The upper ends of members 31 are provided with apertures 32 through which they may be secured to the support 33 by wing nuts 34.

With reference to the gelling and fusion zones hereinbefore described and illustrated in FIGS. 1 and 4, it will be understood that the boundaries of these zones will vary for different formulations. Moreover, with respect to any given formulation, the exact borders are not always distinct and cannot always be fixed exactly. Nevertheless, the concept of such zones is a useful aid to description, and it is true that for every formulation, there is a distinct temperature zone within which gelling takes place, and a second distinct temperature zone within which fusion takes place. The approximate boundaries of the zones for any particular formulation can easily be determined by test. It was the recognition of these distinct zones and the changes which occur therein which suggested the methods of heat control utilized in the present invention as a means of overcoming the problems of utilizing radio frequency heating for curing vinyl resin foam.

It will be understood that the invention may be variously modified and embodied within the scope of the subjoined claims.

We claim as our invention:
1. Apparatus for curing plasticized vinyl resin foam, comprising two spaced electrodes, one of said electrodes being connected to a source of radio frequency electric current, and the other being grounded, a conveyor belt mounted to move between said electrodes, means is deposit ungelled foam on said conveyor before it enters the space between said electrodes, and separate, additional means for controlling the ambient temperatures surrounding the foam while it moves between said electrodes to cause said ambient temperatures to increase progressively from the point where the foam first enters the space between the electrodes to at least the point where the foam is gelled.

2. Apparatus for curing plasticized vinyl resin foam, comprising two spaced electrodes, one of said electrodes being connected to a source of radio frequency electric current, and the other being grounded, a conveyor belt mounted to move between said electrodes, means to deposit foam on said conveyor before it enters the space between said electrodes, said first electrode comprising two electrically connected but relatively movable sections, the section nearest said depositing means extending substantially parallel to said grounded electrode and to said conveyor and the other of said sections being tilted upwardly relative to said grounded electrode and to said conveyor so that as said conveyor carries the foam between said electrodes, the effective voltage is progressively reduced as the foam passes under said tilted electrode.

3. Apparatus as claimed in claim 2 including means for adjusting said tilted section to alter the angle of tilt.

4. Apparatus as claimed in claim 1 in which said separate additional means for controlling the ambient temperatures surrounding the foam while it moves between said electrodes includes means for increasing the temperatures of said electrodes from the point where the foam enters the space between the electrodes.

5. Apparatus for curing plasticized vinyl resin foam, comprising two spaced electrodes, one of said electrodes being connected to a source of radio frequency electric current, and the other electrode being grounded, a conveyor belt mounted to move between said electrodes, means to deposit ungelled foam on said conveyor before it enters the space between said electrodes, said first electrode comprising two electrically connected but relatively movable sections, the section nearest said depositing means extending substantially parallel to said grounded electrode and to said conveyor and the other of said sections being tilted upwardly relative to said grounded electrode and to said conveyor so that as said conveyor carries the foam between said electrodes, the effective voltage is progressively reduced as the foam passes under said tilted electrode, and separate, additional means for controlling the ambient temperatures surrounding the foam while it moves between said electrodes to cause said ambient temperatures to increase progressively from the point where the foam first enters the space between the electrodes to at least the point where the foam is gelled.

6. Apparatus as claimed in claim 5 including means surrounding said depositing means within which a dehumidified atmosphere may be maintained.

References Cited in the file of this patent

UNITED STATES PATENTS

| | | |
|---|---|---|
| 1,806,846 | Fox et al. | May 26, 1931 |
| 2,231,457 | Stephen | Feb. 11, 1941 |
| 2,370,624 | Gillespie | Mar. 6, 1945 |
| 2,372,929 | Blessing | Apr. 3, 1945 |
| 2,406,714 | Strickland | Aug. 27, 1946 |
| 2,463,289 | Leguillon | Mar. 1, 1949 |
| 2,492,000 | Morris et al. | Dec. 20, 1949 |
| 2,546,004 | Kinn | Mar. 20, 1951 |
| 2,586,996 | Rosenthal | Feb. 26, 1952 |
| 2,604,665 | Bosomworth et al. | June 29, 1952 |
| 2,822,573 | Wasniewski et al. | Feb. 11, 1958 |
| 2,837,440 | Boivin | June 3, 1958 |
| 2,841,205 | Bird | July 1, 1958 |
| 2,929,793 | Hirsh | Mar. 22, 1960 |

FOREIGN PATENTS

| | | |
|---|---|---|
| 606,165 | Great Britain | Aug. 6, 1948 |

OTHER REFERENCES

Miller: "Rotational Molding of Hollow Goods," Sec., "Operational Problems," February 1956, a pamphlet from The Akron Presform Mold Co., Cuyahoga Falls, Ohio, material taken from Rubber Age, February 1956.